United States Patent
Kim et al.

(10) Patent No.: US 7,257,296 B2
(45) Date of Patent: Aug. 14, 2007

(54) OPTICAL WAVEGUIDE ELEMENT WITH DIRECTIONAL COUPLER

(75) Inventors: Kyoung-Youm Kim, Anyang-shi (KR); Sun-Tae Jung, Anyang-shi (KR)

(73) Assignee: Samsung Electronics Co., Ltd., Suwon-Di, Gyeonggi-Do (KR)

(*) Notice: Subject to any disclaimer, the term of this patent is extended or adjusted under 35 U.S.C. 154(b) by 190 days.

(21) Appl. No.: 10/692,343

(22) Filed: Oct. 23, 2003

(65) Prior Publication Data

US 2004/0252945 A1 Dec. 16, 2004

(30) Foreign Application Priority Data

Jun. 11, 2003 (KR) .................. 10-2003-0037487

(51) Int. Cl.
*G02B 6/26* (2006.01)

(52) U.S. Cl. .................. 385/42; 385/28; 385/31

(58) Field of Classification Search .............. None
See application file for complete search history.

(56) References Cited

U.S. PATENT DOCUMENTS 5,200,612 A * 4/1993 Moriya et al. .............. 250/239
5,633,962 A * 5/1997 Kurata .......................... 385/24
6,480,647 B1 * 11/2002 Kitamura ..................... 385/24

FOREIGN PATENT DOCUMENTS

JP       03223705 A   * 10/1991

* cited by examiner

*Primary Examiner*—Sung Pak
(74) *Attorney, Agent, or Firm*—Cha & Reiter, LLC

(57) ABSTRACT

An optical waveguide element having a directional coupler is disclosed. The element includes a first and a second waveguide located adjacent to each other at a predetermined portion for mode coupling, a first dummy waveguide extending from an one end of the second waveguide, a reflector installed on an end surface of the first dummy waveguide, and a second dummy waveguide located adjacent to the first dummy waveguide at a predetermined portion for a mode coupling. The optical signals progressing from the second dummy waveguide to the first dummy waveguide disappear while sequentially passing through the reflector and the second dummy waveguide. In the optical waveguide element, optical signals passing through the first dummy waveguide gradually disappear while passing through the reflector and the second dummy waveguide, thereby improving a bi-directional cross-talk.

20 Claims, 12 Drawing Sheets

OPTICAL WAVEGUIDE ELEMENT WITH DIRECTIONAL COUPLER

CLAIM OF PRIORITY

This application claims priority to an application entitled "Optical waveguide element with directional coupler," filed in the Korean Intellectual Property Office on Jun. 11, 2003 and assigned Serial No. 2003-37487, the contents of which are hereby incorporated by reference.

BACKGROUND OF THE INVENTION

1. Field of the Invention

The present invention relates to an optical waveguide element, and more particularly to an optical waveguide element with a directional coupler.

2. Description of the Related Art

An optical waveguide element is an optical element that performs either optoelectric conversion, or a multiplexing and demultiplexing function of optical signals at a transceiving terminal in an optical communication network. In general, the optical waveguide element includes an under cladding layer, a predetermined pattern of core layer, and an over cladding layer that are sequentially laminated on a silicon or polymer substrate.

The transceiving terminal in the optical communication network includes a light source for generating optical signals, and a photodetector for detecting received optical signals. The light source and the photodetector may be separately installed on the transceiving terminal in the optical communication network, respectively. The light source and the photodetector, which have been mounted on one substrate, may be included in a bi-directional optical transceiving module. In the bi-directional optical transceiving module, the light source and the photodetector transmit optical signals to a communication network through one multiplexer, respectively, or receive optical signals from a communication network. Such multiplexers include an arrayed waveguide grating, a multi-mode interferometer and a directional coupler.

FIG. 1 is a diagram illustrating a first type of conventional directional coupler 10. As shown in FIG. 1, the directional coupler 10 includes a first/second waveguide 11 and 12 located adjacent to each other at a predetermined portion for a mode coupling, an input waveguide 11a for providing an input/output of an optical signals, a dummy waveguide 12a, and a first/second output waveguide 11b and 12b.

The first waveguide 11 and the second waveguide 12 are located adjacent to each other at a predetermined portion, and linearly extend in parallel to each other, thereby providing mutual coupling of optical signals. According to the length of parallel portions of the first waveguide 11 and the second waveguide 12, an optical signal coupled to an adjacent waveguide can be adjusted up to 100%.

The input waveguide 11a extends beyond a predetermined curved section 11c from one end of the first waveguide 11, and receives an optical signal 19 from or outputs an optical signal 19 to a communication network.

The first output waveguide 11b extends beyond a predetermined curved section 11d from other end of the first waveguide 11. The first output waveguide 11b is connected to a light source (not shown) or a photodetector (not shown).

The dummy waveguide 12a extends beyond a predetermined curved section 12c from one end of the second waveguide 12. It is preferred that an end surface 18 is terminated.

The second output waveguide 12b extends beyond a predetermined curved section 12d from other end of the second waveguide 12. The second output waveguide 12b is connected to a light source (not shown) or a photodetector (not shown).

A construction in which the light source is connected to the first output waveguide 11b of the directional coupler 10 and the photodetector is connected to the second output waveguide 12b will now be described. In this construction, an optical signal input from a communication network is input to the first waveguide 11 via the input waveguide 11a. The optical signals are coupled to the second waveguide 12 while passing through the first waveguide 11. The optical signals pass through the second output waveguide 12b, and then are detected by the photodetector. In this case, some optical signals are not coupled to the second waveguide 12, and progress toward the light source through the first output waveguide 11b. The amount of optical signals transmitted to the light source is called one-way cross-talk.

Optical signals emitted from the light source pass through the first output waveguide 11b, and then are input to the first waveguide 11. The optical signals are not coupled to the second waveguide 12 while passing through the first waveguide 11. The optical signals pass through the input waveguide 11a, and then are transmitted to the communication network. While the optical signals emitted from the light source pass through the first waveguide 11, some optical signals are coupled to the second waveguide 12, and progress toward the dummy waveguide 12a. The optical signals that progress toward the dummy waveguide 12a are reflected by the end surface 18, and then again pass through the dummy waveguide 12a. The reflected optical signals are then input to the second waveguide 12. The optical signals are not coupled to the first waveguide 11 while passing through the second waveguide 12, and progress toward the photodetector via the second output waveguide 12b. The amount of optical signals transmitted to the photodetector is called bi-directional cross-talk (hereinafter, referred to 'BXT'). The BXT implies a distortion of received signals caused by transmitted signals. Removing optical signals caused by the BXT is an important factor dominating the quality of optical waveguide elements such as a directional coupler.

The structure of a conventional directional coupler that attempts to minimize the amount of BXT is shown in FIG. 2 and FIG. 3.

FIG. 2 is a diagram illustrating a second-type of conventional directional coupler 20. As shown in FIG. 2, the directional coupler 20 includes a first/second waveguide 21 and 22 located adjacent to each other at a predetermined portion for a mode coupling, an input waveguide 21a for providing an input/output of optical signals, a dummy waveguide 22a, and a first/second output waveguide 21b and 22b. The first waveguide 21 and the second waveguide 22 linearly extend in parallel at a predetermined portion, thereby providing mutual coupling of optical signals. The input waveguide 21a, a dummy waveguide 22a, and a first/second output waveguide 21b and 22b extend beyond predetermined curved sections 21c, 22c, 21d and 22d from end portions of the first/second waveguide 21 and 22, respectively. The directional coupler 20 receives optical signals 29 or outputs the optical signals 29 through the input waveguide 21a.

Also, an end surface 28 of the dummy waveguide 22a is terminated in such a way so as to be inclined with a predetermined angle $\theta_b$ with respect to a longitudinal direction of the dummy waveguide 22a. This is done to minimize the amount of optical signals reflected by the end surface 28 of the dummy waveguide 22*a*. In general, the end surface 28 of the dummy waveguide 22*a* is inclined with an angle of 82° with respect to a longitudinal direction of the dummy waveguide 22*a*. Accordingly, the end surface 28 of the dummy waveguide 22*a* is inclined with an angle of 8° with respect to a sectional surface perpendicular to the longitudinal direction of the dummy waveguide 22*a*.

FIG. 3 is a view illustrating a third-type of conventional directional coupler 30. As shown in FIG. 3, the directional coupler 30 includes a first/second waveguide 31 and 32 located adjacent to each other at a predetermined portion for a mode coupling, an input waveguide 31*a* for providing an input/output of optical signals, a dummy waveguide 32*a*, and a first/second output waveguide 31*b* and 32*b*. The first waveguide 31 and the second waveguide 32 linearly extends in parallel at a predetermined portion, thereby providing mutual coupling of optical signals. The input waveguide 31*a*, a dummy waveguide 32*a*, and a first/second output waveguide 31*b* and 32*b* extend beyond predetermined curved sections 31*c*, 32*c*, 31*d* and 32*d* from end portions of the first/second waveguide 31 and 32, respectively. The directional coupler 30 receives optical signals 39 or outputs the optical signals 39 through the input waveguide 31*a*.

Also, in order to minimize the amount of optical signals reflected by an end surface of the dummy waveguide 32*a*, the directional coupler 30 further includes a curved waveguide 38 which extends from the end surface of the dummy waveguide 32*a* and has a predetermined curvature r. As the curvature r of the curved waveguide 38 grows smaller, the reflection improvement effect increases, and the size of an optical waveguide element including the directional coupler 30 becomes smaller. However, the reflectivity on a boundary surface 38*a* between the dummy waveguide 32*a* and the curved waveguide 38 increases.

In the conventional directional couplers described above, in order to remove optical signals passing through a dummy waveguide, an end surface of the dummy waveguide has been terminated in such a way so as to be inclined or a curved waveguide has extended. However, the optical signals passing through the dummy waveguide do not completely disappear, and some optical signals are reflected, thereby causing a distortion of optical signals in the directional coupler. In addition, the distortion of the optical signals in the directional coupler becomes more and more severe when an error occurs in the course of forming an optical waveguide on an optical waveguide element because the optical signals passing through the dummy waveguide do not completely disappear.

SUMMARY OF THE INVENTION

Accordingly, one object of the present invention is to solve the above-mentioned problems occurring in the prior art.

Another object of the present invention is to provide an optical waveguide element, which includes a directional coupler, capable of improving a bi-directional cross-talk by effectively removing optical signals passing through a dummy waveguide.

One embodiment of the present invention is directed to an optical waveguide element having a directional coupler including a first waveguide and a second waveguide located adjacent to each other at a predetermined portion for a mode coupling in a position adjacent to each other at a predetermined portion for a mode coupling, a first dummy waveguide extending from an one end of the second waveguide, a reflector installed on an end surface of the first dummy waveguide, and a second dummy waveguide located adjacent to the first dummy waveguide at a predetermined portion for a mode coupling. The optical signals progressing from the second dummy waveguide to the first dummy waveguide disappear while sequentially passing through the reflector and the second dummy waveguide.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Embodiments of the present invention will be described with reference to the accompanying drawings. For the purposes of clarity and simplicity, a detailed description of known functions and configurations incorporated herein will be omitted as it may obscure the subject matter of the present invention.

Figure 1:
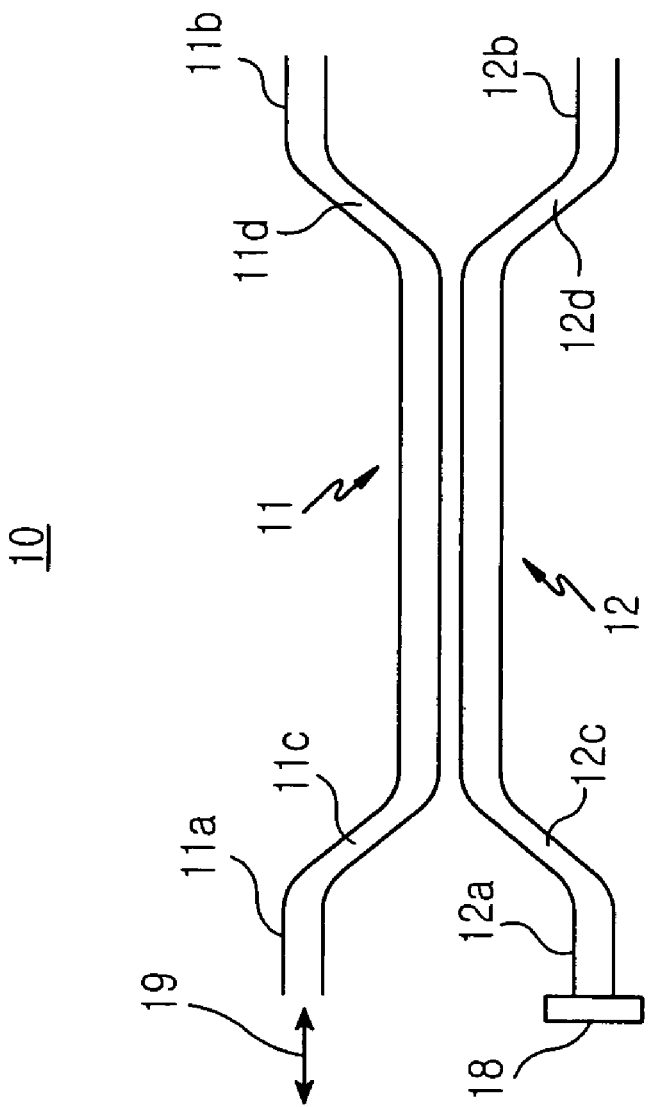
FIG. 1 is a diagram illustrating a first-type of conventional directional coupler.
Figure 2:
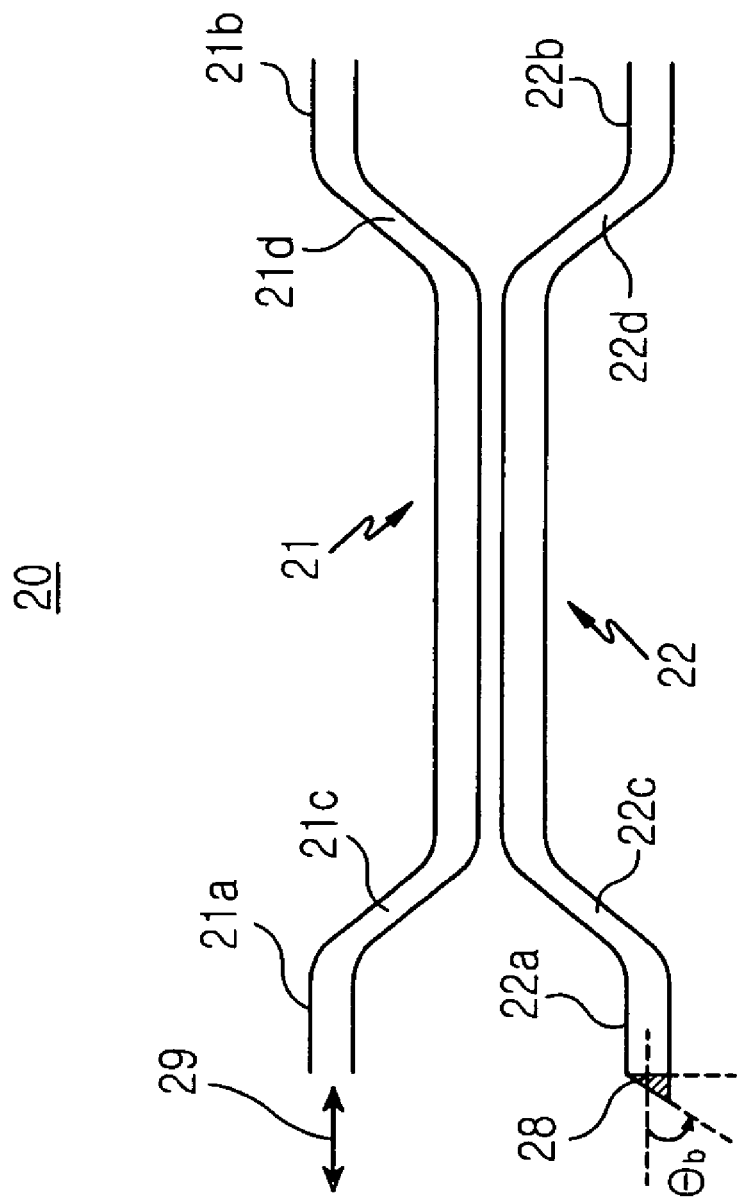
FIG. 2 is a diagram illustrating a second-type of conventional directional coupler.
Figure 3:
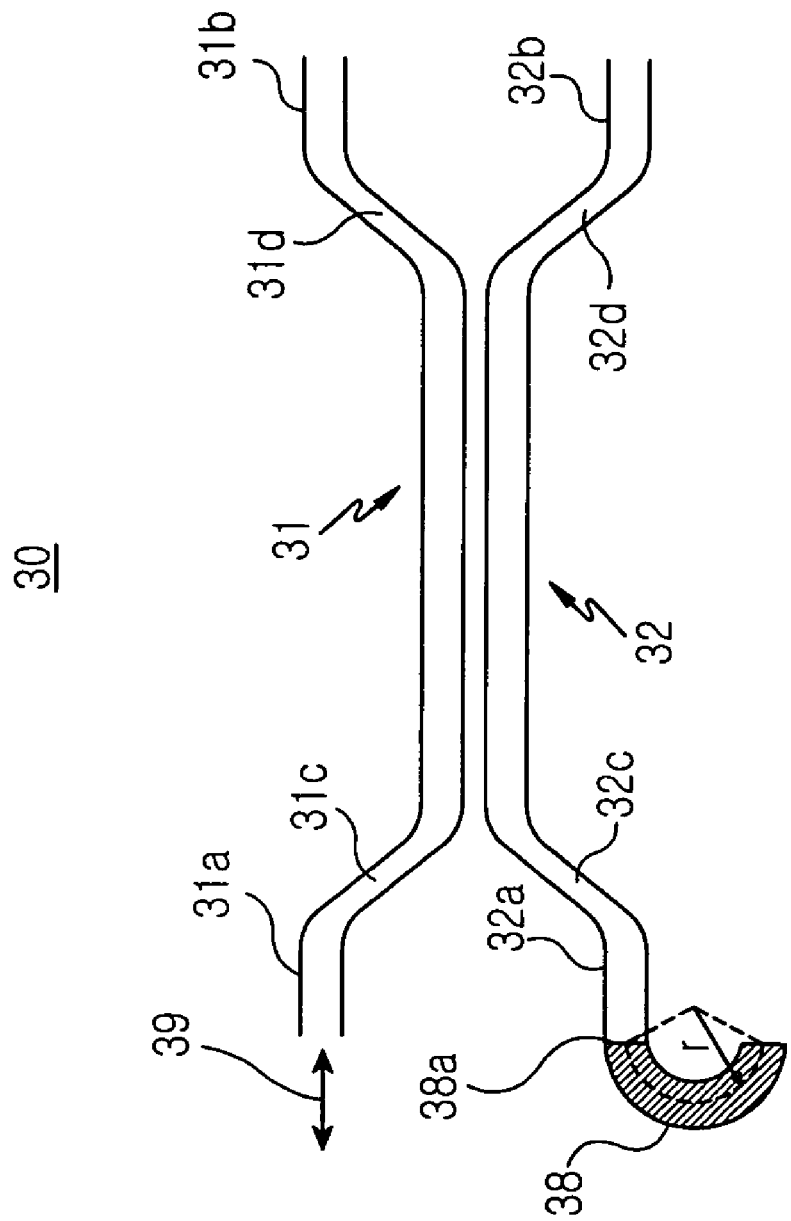
FIG. 3 is a diagram illustrating a third-type of conventional directional coupler.
Figure 4:
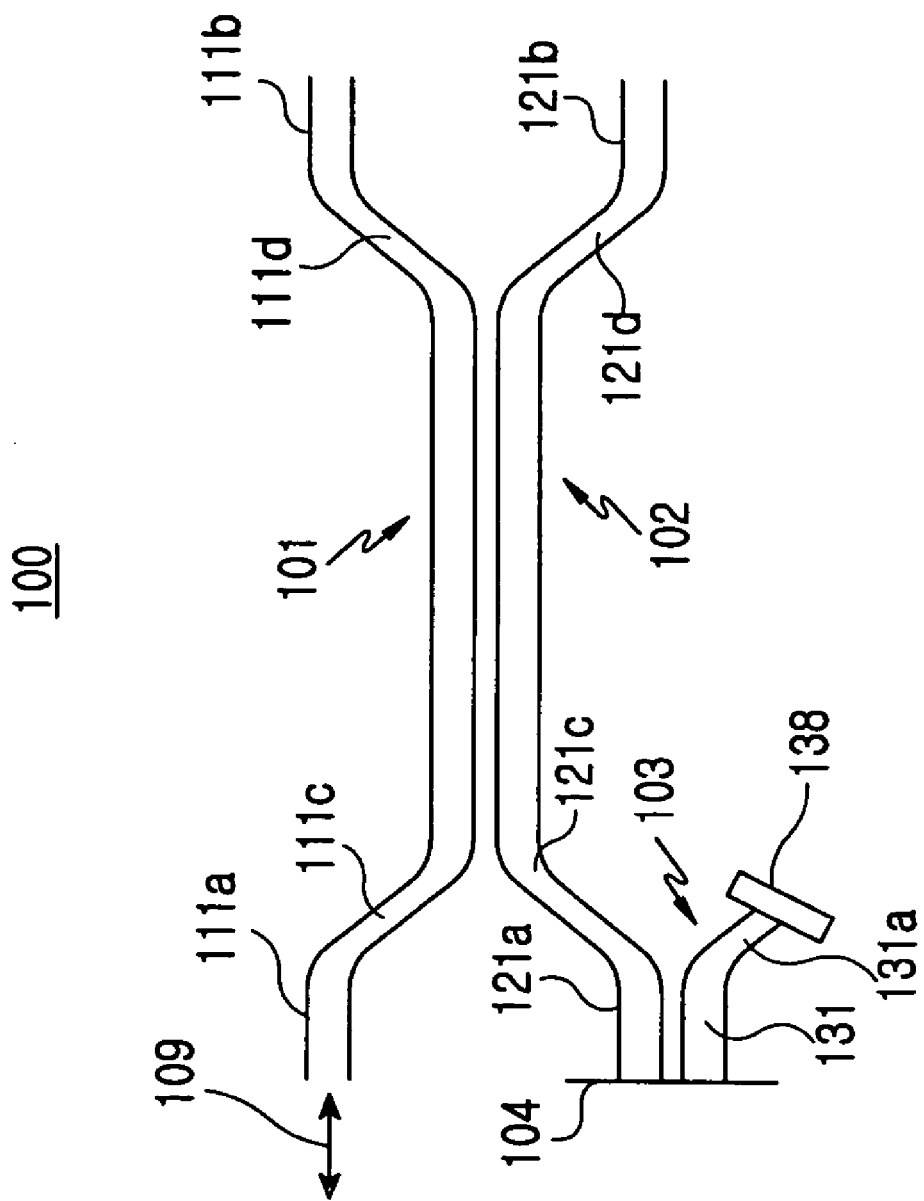
FIG. 4 is a diagram illustrating a directional coupler according to a first embodiment of the present invention.

FIG. 4 is a view illustrating a directional coupler 100 according to a first embodiment of the present invention. As shown in FIG. 4, the directional coupler 100 includes a first/second waveguide 101 and 102, an input waveguide 11*a*, a first/second output waveguide 111*b* and 121*b*, a first/second dummy waveguide 121*a* and 103, and a reflector 104.

The first waveguide 101 and the second waveguide 102 are located adjacent to each other at a predetermined portion for a mode coupling, and linearly extends in parallel, thereby providing mutual coupling of optical signals. According to the length linearly of parallel portions of the first waveguide 101 and the second waveguide 102, the optical signals coupled to an adjacent waveguide can be adjusted up to 100%.

The input waveguide 111a extends beyond a predetermined curved section 111c from one end of the first waveguide 101, and receives optical signals 109 from or outputs the optical signals 109 from a communication network.

The first output waveguide 111b extends beyond a predetermined curved section 111d from the other end of the first waveguide 101. The first output waveguide 111b maybe connected to a light source 413 (shown in FIG. 9) or a photodetector 511 (shown in FIG. 10).

The second output waveguide 121b extends beyond a predetermined curved section 121d from other end of the second waveguide 102. The first output waveguide 111b maybe connected to a light source 513 (shown in FIG. 9) or a photodetector 511 (shown in FIG. 10).

The first dummy waveguide 121a extends beyond a predetermined curved section 121c from one end of the second waveguide 102. The other end surface of the first dummy waveguide 121a is provided with the reflector 104.

For mode coupling, a predetermined portion 131 of the second dummy waveguide 103 from the reflector 104 extends in parallel to the first dummy waveguide 121a, and another portion 131a of the second dummy waveguide 103 after the predetermined portion 131 extends in a direction going farther from the curved section 121c between the first dummy waveguide 121a and the second waveguide 102. It is preferred that an end surface 138 of the second dummy waveguide 103 is terminated so that optical signals, which pass through the second dummy waveguide 103, can not again progress toward the reflector 104 after having been reflected by the end surface 138.

In the directional coupler 100 constructed as described above, a light source maybe connected to a side of the first output waveguide 111b or second output waveguide 121b. For example, when the light source 413 is connected to the first output waveguide 111b, optical signals emitted from the light source 413 progresses toward a communication network via the first output waveguide 111b, the first waveguide 101 and the input waveguide 111a. While the optical signals emitted from the light source 413 pass through the first waveguide 101, some optical signals are coupled to the second waveguide 102, and then pass through the first dummy waveguide 121a.

When a light source 513 is connected to the second output waveguide 121b, optical signals emitted from the light source 513 are input to the second waveguide 102. While the optical signals pass through the second waveguide 102, the optical signals are coupled to the first waveguide 101, and then pass through the input waveguide 111a. The optical signals emitted from the light source 513 are not completely coupled to the first waveguide 101, and some optical signals may pass through the first dummy waveguide 121a.

The optical signals passing through the first dummy waveguide 121a disappear while passing through the reflector 104 and the second dummy waveguide 103. This is described below with reference to FIG. 7 and FIG. 8.

Figure 5:
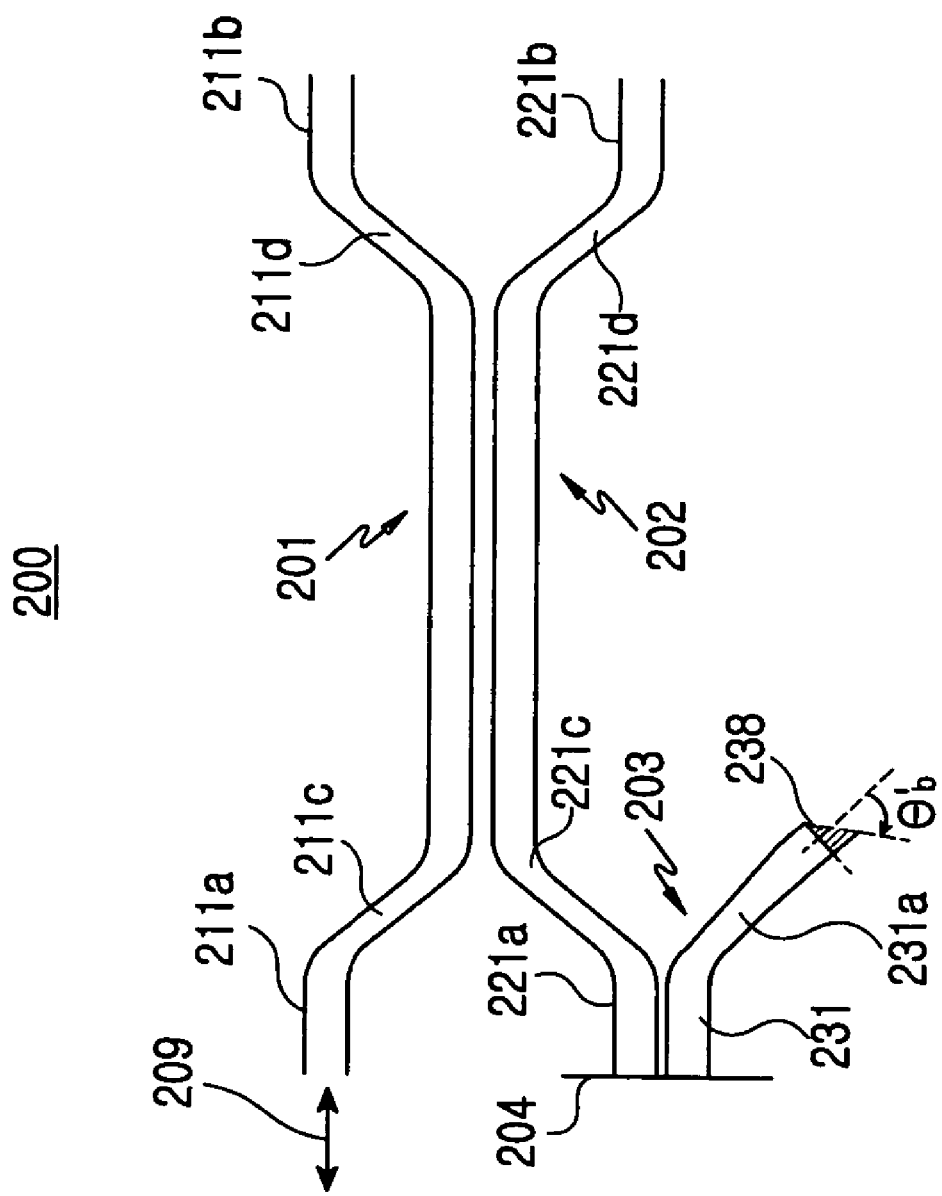
FIG. 5 is a diagram illustrating a directional coupler according to a second embodiment of the present invention.
Figure 6:
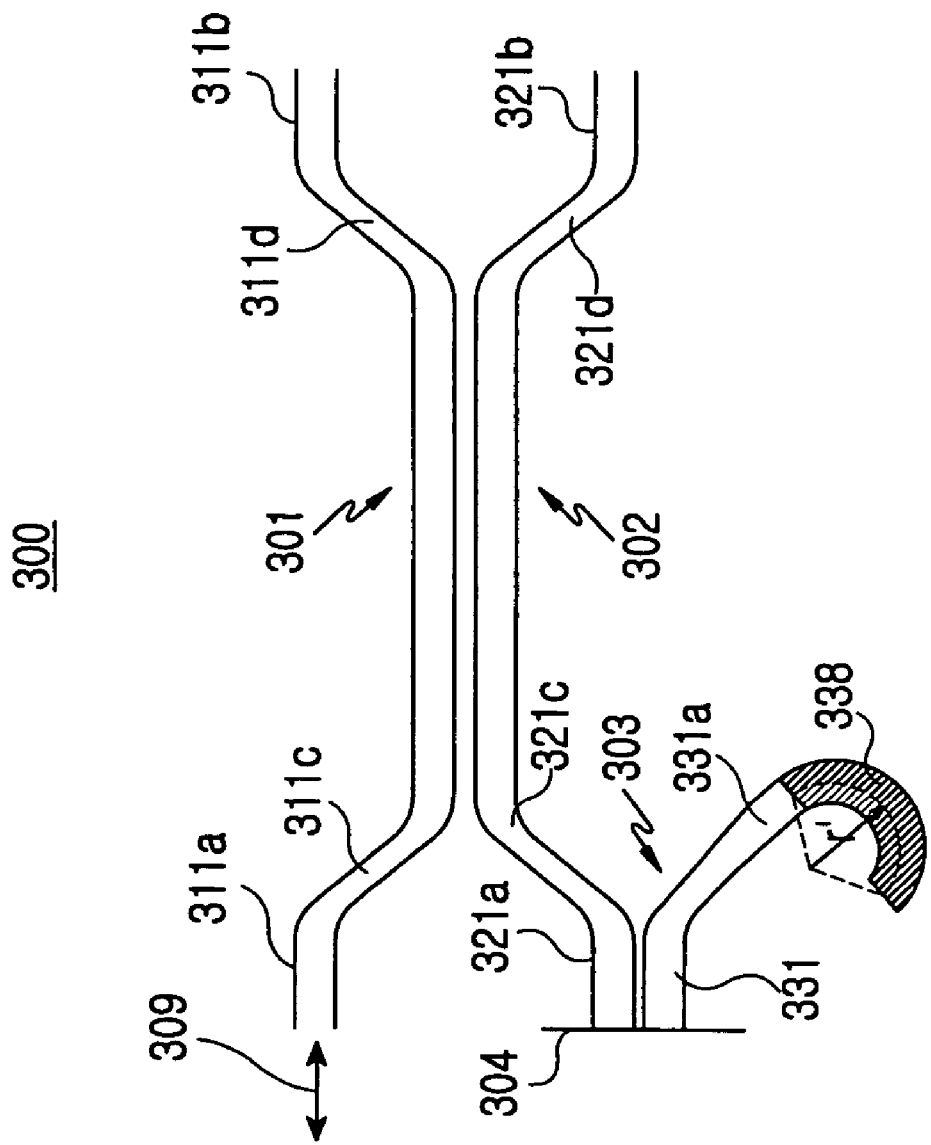
FIG. 6 is a diagram illustrating a directional coupler according to a third embodiment of the present invention.

Two embodiments of directional couplers that minimize the amount of the optical signals reflected by the end surface 138 of the second dummy waveguide 103 are shown in FIG. 5 and FIG. 6.

FIG. 5 is a diagram illustrating a directional coupler 200 according to a second embodiment of the present invention. The directional coupler 200 includes a first/second waveguide 201 and 202, an input waveguide 211a, a first/second output waveguide 211b and 221b, a first/second dummy waveguide 221a and 203, and a reflector 204. An end surface 238 of the second dummy waveguide 203 is terminated in such a way so as to be inclined with a predetermined angle $\theta_b$ with respect to a longitudinal direction of the end surface 238 of the second dummy waveguide 203.

The first waveguide 201 and the second waveguide 202 linearly extends in parallel at a predetermined portion, thereby providing mutual coupling of optical signals. The input waveguide 211a, first/second output waveguide 211b and 221b, and a first dummy waveguide 221a extend beyond predetermined curved sections 211c, 211d, 221c and 221d from end portions of the first/second waveguide 201 and 202, respectively.

The reflector 204 is provided at an end surface of the first dummy waveguide 221a, and enables optical signals passing through the first dummy waveguide 221a to be incident into the second dummy waveguide 203.

For mode coupling, a predetermined portion 231 of the second dummy waveguide 203 from the reflector 204 extends in parallel to the first dummy waveguide 221a. Preferably, the length of the predetermined portion 231 must be equal to that of the first dummy waveguide 221a. However, it can be designed to have different length.

And another portion 231a of the second dummy waveguide 203 after the predetermined portion 231 extends in a direction going farther from the first dummy waveguide 221a. Preferably, the length of another portion 231a must be equal to that of the predetermined curved section 221c and the shape of another portion 231a must be symmetrical to that of the predetermined curved section 221c. However, it can be designed to have different length. The directional coupler 200 receives optical signals 209 from or transmits the optical signals 209 to a communication network via the input waveguide 211a.

In order to minimize the amount of optical signals that are reflected by the end surface 238 of the second dummy waveguide 203 and progress toward the reflector 204 and the first dummy waveguide 221a, the end surface 238 of the second dummy waveguide 203 is terminated in such a way so as to be inclined with a predetermined angle $\theta_b$ with respect to a longitudinal direction of the end surface 238 of the second dummy waveguide 203. In general, the end surface 238 of the second dummy waveguide 203 is inclined with an angle of 82° with respect to a longitudinal direction of the second dummy waveguide 203. Accordingly, the surface of the end surface 238 of the second dummy waveguide 203 is inclined with an angle of 8° with respect to a sectional surface perpendicular to the longitudinal direction of the second dummy waveguide 203.

FIG. 6 is a diagram illustrating a directional coupler 300 according to a third embodiment of the present invention. The directional coupler 300 according to a third embodiment of the present invention includes a first/second waveguide 301 and 302, an input waveguide 311a, a first/second output waveguide 311b and 321b, a first/second dummy waveguide 321a and 303, and a reflector 304. Further, a curved waveguide 338 extends in a predetermined curvature further from the end surface of the second dummy waveguide 303.

The first waveguide 301 and the second waveguide 302 linearly extends in parallel at a predetermined portion, thereby providing mutual coupling of optical signals. The input waveguide 311a, first/second output waveguide 311b and 321b, and a first dummy waveguide 321a extend beyond predetermined curved sections 311c, 311d, 321c and 321d from end portions of the first/second waveguide 301 and 302, respectively.

The reflector 304 is provided at an end surface of the first dummy waveguide 321a, and enables optical signals passing through the first dummy waveguide 321a to be incident into the second dummy waveguide 303.

For mode coupling, a predetermined portion 331 of the second dummy waveguide 303 from the reflector 304 extends in parallel to the first dummy waveguide 321a. Preferably, the length of the predetermined portion 331 must be equal to that of the first dummy waveguide 321a. However, it can be designed to have different length.

And another portion 331a of the second dummy waveguide 303 after the predetermined portion 331 extends 331a in a direction going farther from the first dummy waveguide 321a. Preferably, the length of another portion 331a must be equal to that of the predetermined curved section 321c and the shape of another portion 331a must be symmetrical to that of the predetermined curved section 321c. However, it can be designed to have different length.

The directional coupler 300 receives optical signals 309 from or transmits the optical signals 209 to the communication network via the input waveguide 211a.

In order to minimize the amount of optical signals that are reflected by the end surface of the second dummy waveguide 303 and progress toward the reflector 304 and the first dummy waveguide 321a, a curved waveguide 338 extends in a predetermined curvature r further from the end surface of the second dummy waveguide 303.

Figure 11:
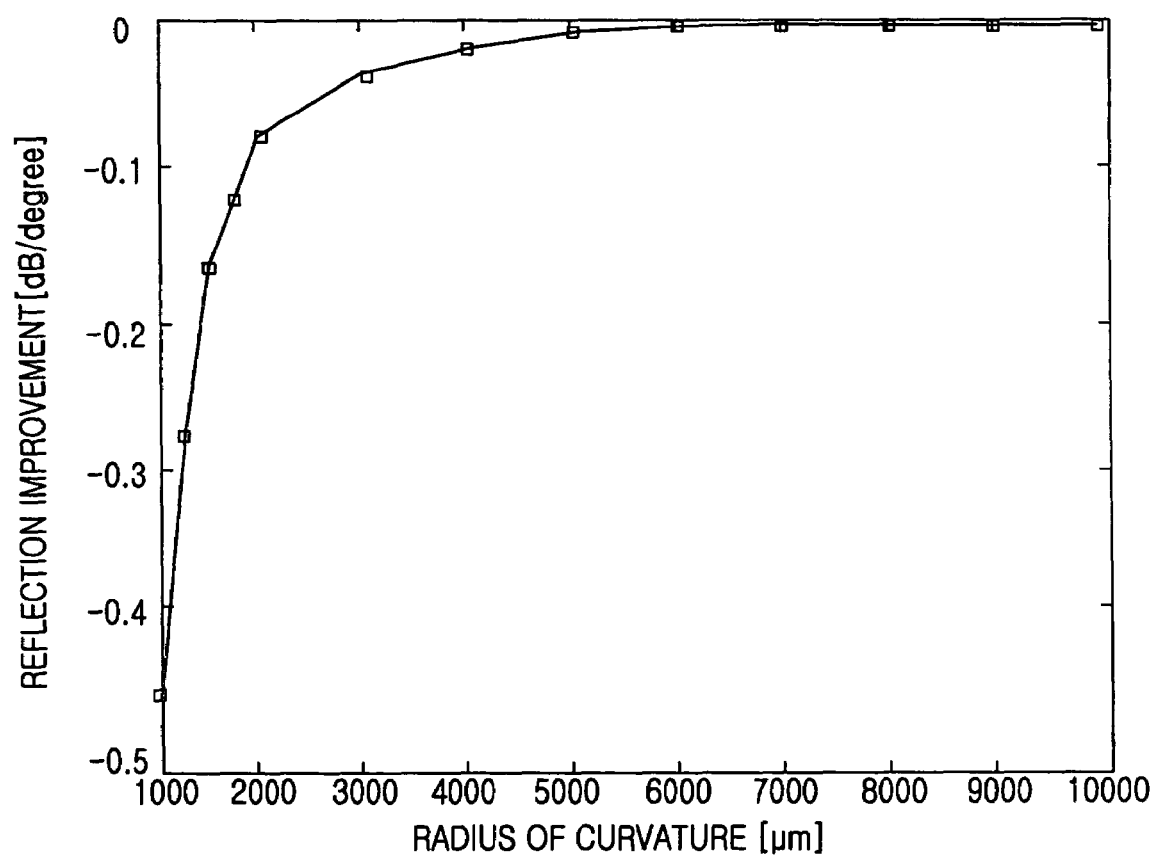
FIG. 11 is a graph illustrating a reflection improvement effect according to a curvature radius of a curved waveguide respectively shown in FIG. 3 and FIG. 6.

Referring now to FIG. 11, a graph 40 shows an effect of reflection improvement per 1° of the curved waveguide 338 according to the curvature r of the curved waveguide 338.

Figure 12:
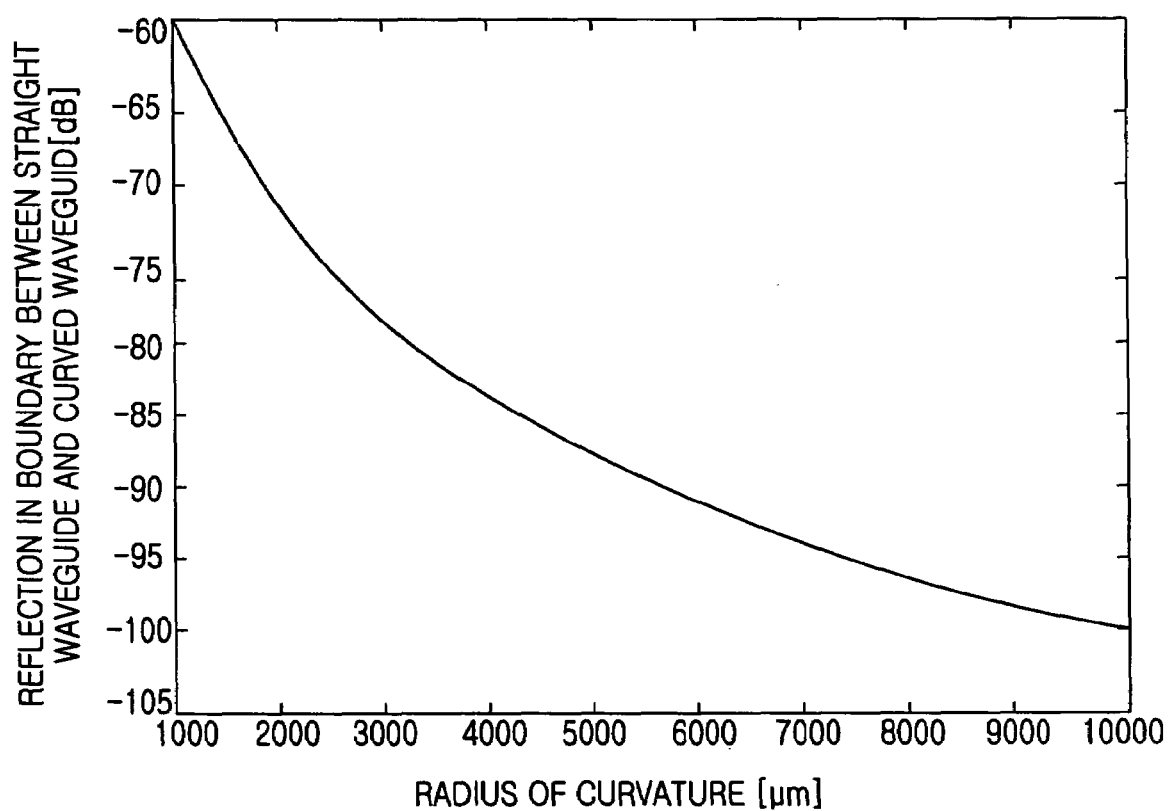
FIG. 12 is a graph illustrating a reflectivity in a boundary surface between a straight waveguide and a curved waveguide according to a curvature of a curved waveguide respectively shown in FIG. 3 and FIG. 6.

FIG. 12 is a graph 50 illustrating reflectivity in a boundary surface between the straight waveguide and the curved waveguide, that is, the second dummy waveguide 303 and the curved waveguide 338, according to the curvature r of the curved waveguide 338. As shown in FIG. 11 and FIG. 12, as the curvature r of the curved waveguide 338 grows smaller, the reflection improvement effect increases. Further, as the curvature r of the curved waveguide 338 grows smaller, the reflectivity in the boundary surface between the second dummy waveguide 303 and the curved waveguide 338 increases. Accordingly, in consideration of the reflection improvement effect and the reflectivity in the boundary surface, the curvature r must be determined so that the amount of optical signals reflected by the end surface of the curved waveguide 338 can be minimized.

Figure 7:
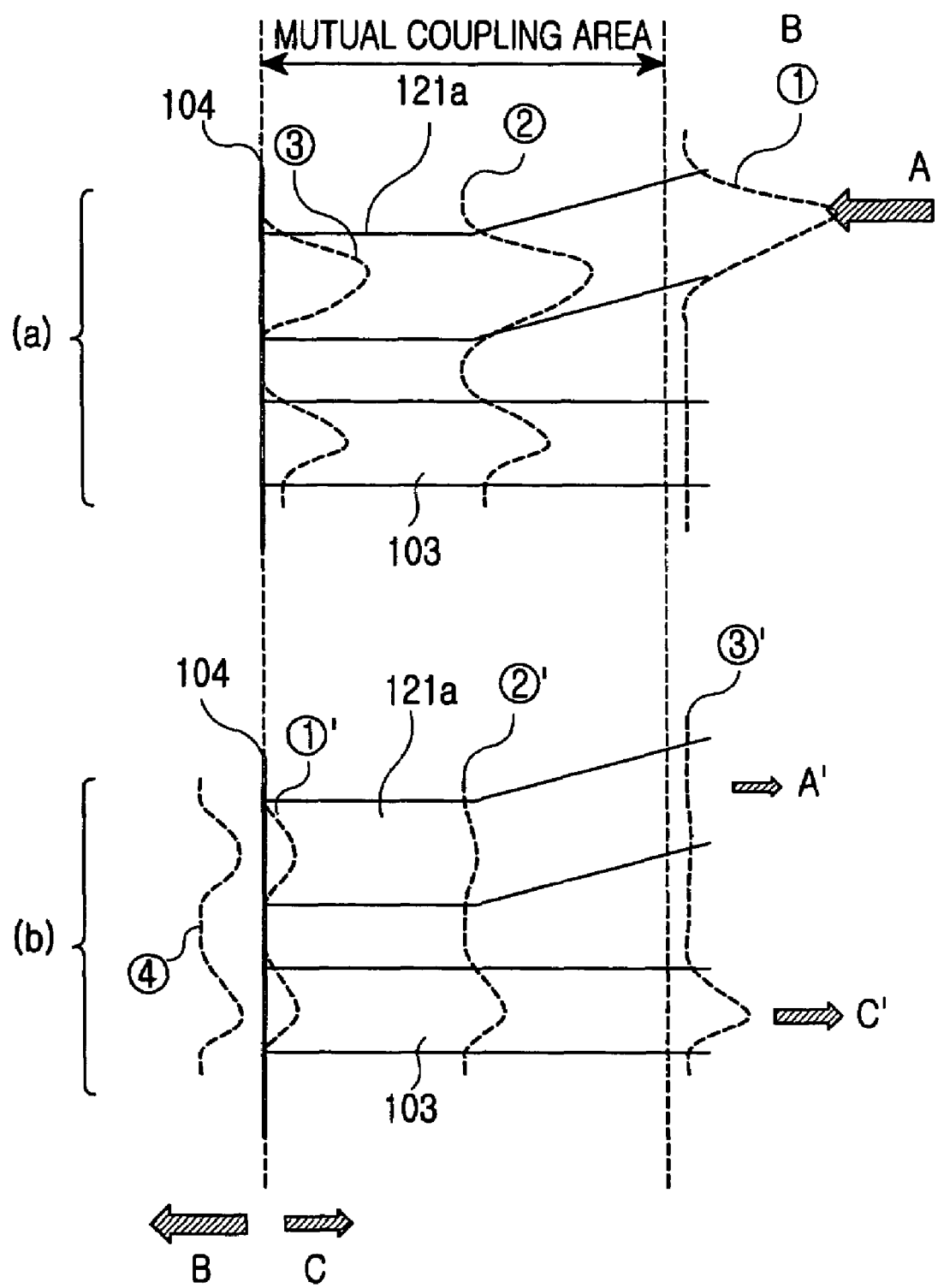
FIG. 7 is a view showing optical signals which pass through a first dummy waveguide of the directional coupler shown in FIG. 4.
Figure 8:
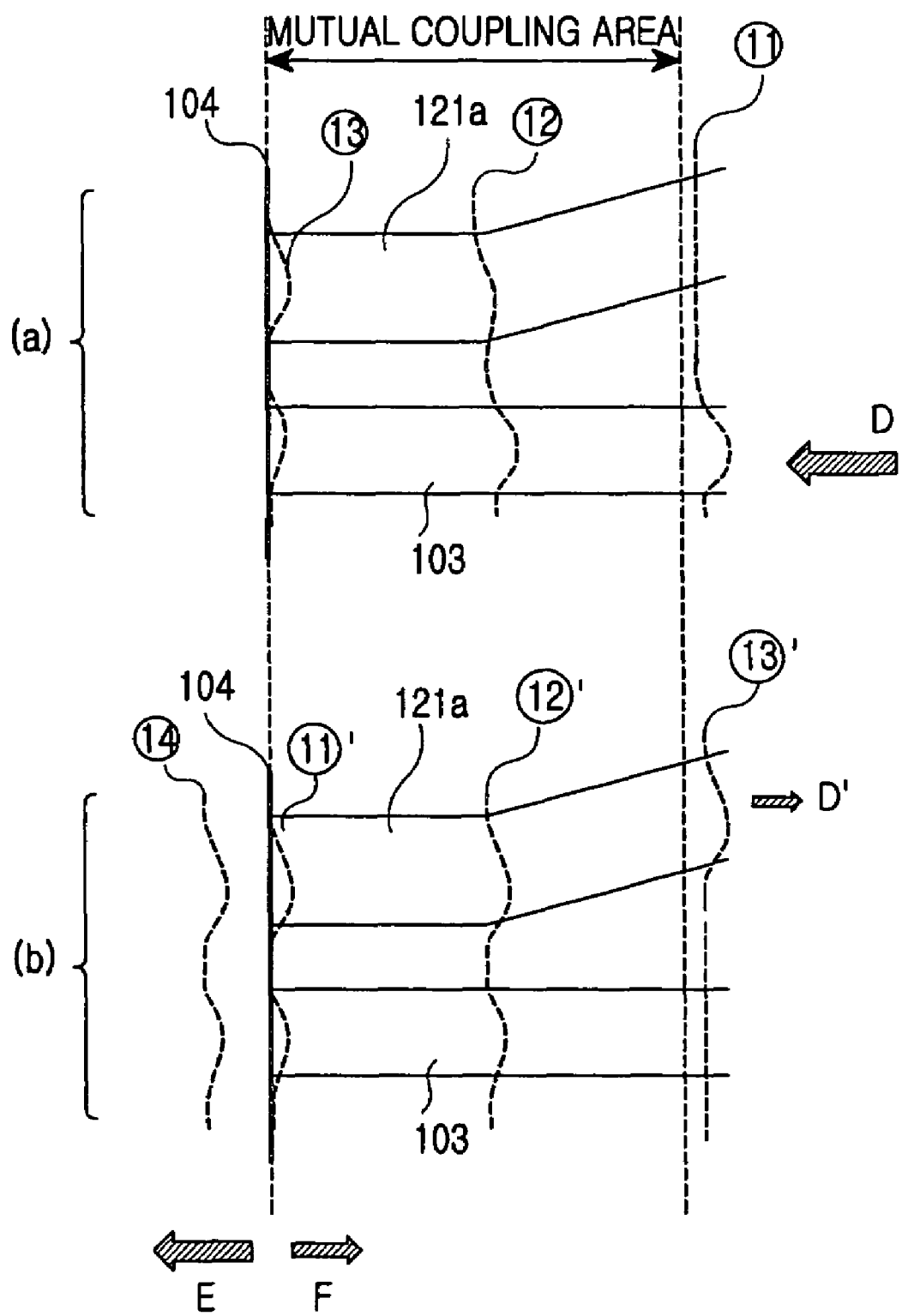
FIG. 8 is a view showing progression of the optical signals which have been reflected by an end surface of a second dummy waveguide of the directional coupler shown in FIG. 4.

FIGS. 7 and 8 show a process in which optical signals from the first dummy waveguide 121a of the directional coupler 100 disappear while passing through the reflector 104 and the second dummy waveguide 103.

In section (a) of FIG. 7, reference symbols ①, ② and ③ are curves representing an intensity of optical signals varied as the optical signals progress in a direction of the reflector 104 at the first dummy waveguide 121a. As shown in FIG. 7, as optical signals A incident into the first dummy waveguide 121a pass through a mutual coupling area, the optical signals A are gradually coupled to the second dummy waveguide 103. Accordingly, some optical signals A passing through the first dummy waveguide 121a are coupled to the second dummy waveguide 103, and then are incident into the reflector 104.

In section (b) of FIG. 7, reference symbols ①', ②', ③', and ④ are curves representing an intensity of optical signals varied as the optical signals pass through the first dummy waveguide 121a and the second dummy waveguide 103 after the optical signals have penetrated or reflected by the reflector 104. Some the optical signals A having been incident into the reflector 104 penetrate B the reflector 104. Other optical signals are reflected C from the reflector 104, and then pass C' through the second dummy waveguide 103, or may progress A' after having been coupled to the first dummy waveguide 121a.

When optical signals A initially incident into the first dummy waveguide 121a are defined as having a value '1' and a ratio of optical signals C reflected by the reflector 104 is defined as having a value $R_{flat}$, a ratio of optical signals B penetrating the reflector 104 has a value calculated by an expression "$1-R_{flat}$". When a ratio of optical signals A' coupled to the first dummy waveguide 121a after having been reflected by the reflector 104 is defined as having a value 'Rx', a ratio of the optical signals A' having been coupled to the first dummy waveguide 121a has a value '$RxR_{flat}$'. The ratio $RxR_{flat}$ of the optical signals A' having been coupled to the first dummy waveguide 121a becomes a part of BXT of the directional coupler 100. A ratio of the optical signals C' passing through the second dummy waveguide 103 from among the optical signals C having been reflected by the reflector 104 is defined as having a value $R_{flat}-RxR_{flat}$, i.e., $(1-Rx) R_{flat}$.

The optical signals C' passing through the second dummy waveguide 103 are reflected by an end surface of the second dummy waveguide 103 and again incident D (shown in FIG. 8) into the reflector 104.

Referring to now to FIG. 8, in section (a) of FIG. 8, reference numerals ⑪, ⑫ and ⑬ are curves representing an intensity of optical signals varied as the optical signals progress in a direction of the reflector 104 at the second dummy waveguide 103. As shown in FIG. 8, as the optical signals D reflected by the end surface 138 of the second dummy waveguide 103 progress the mutual coupling area, some optical signals are coupled to the first dummy waveguide 121a.

In FIG. 8b, reference symbols ⑪, ⑫, ⑬ and ⑭ are curves representing an intensity of optical signals varied as the optical signals pass through the first dummy waveguide 121a and the second dummy waveguide 103 after the optical signals have penetrated or reflected by the reflector 104. Some optical signals D having been a gain incident into the reflector 104 penetrate E the reflector 104. Further, the other optical signals F are reflected by the reflector 104 and progresses D' the first dummy waveguide 121a.

When a ratio of optical signals reflected by the end surface 138 of the second dummy waveguide 103 with respect to the optical signals C' (shown in FIG. 7) passing through the second dummy waveguide 103 is defined as having a value '$R_{art}$', a ratio of the optical signals D incident into the reflector 104 after having been reflected by the end surface 138 of the second dummy waveguide 103 is defined as having a value '$R_{art}(1-R_x)R_{flat}$'. The ratio of the optical signals C' having been incident into the second dummy waveguide 103 after having reflected by the reflector 104 has been already defined as having a value $(1-Rx) R_{flat}$. This ratio may be applied to optical signals D' passing through the first dummy waveguide 121a after having been again incident D on the reflector 104.

Accordingly, a ratio of the optical signals D' passing through the first dummy waveguide 121a after having been again incident into the reflector 104 is defined as having a value $R_{art}(1-R_x)R_{flat} \times (1-R_x)R_{flat}$, i.e., $R_{art}(1-R_x)^2 R_{flat}^2$. The ratio $R_{art}(1-R_x)^2 R_{flat}^2$ of the optical signals D' passing through the first dummy waveguide 121a after having been again incident D on the reflector 104 becomes a part of BXT of the directional coupler 100.

The BXT of the directional coupler 100 according to aspects of the present invention understood through processes as described above is shown in the following equation 1.

$$BXT(dB)=10 \log[(1-R_x)^2 R^2_{flat} R_{art} + R_x R_{flat}] \quad \text{equation 1}$$

When the reflector 104 in the directional coupler 100 is a boundary surface between a core layer and a cladding layer constructing a general optical waveguide, $R_{flat}$ has a value of −50 dB, that is, $10^{-5}$. Accordingly, $(1-R_x)^2 R_{flat}^2 R_{art}$ has an insignificant value in relation to $R_x R_{flat}$.

Accordingly, equation 1 approximates to the following equation 2.

$$BXT(dB)=10 \log(R_x R_{flat}) \quad \text{equation 2}$$

Further, a ratio Rx of optical signals coupled between the first dummy waveguide 121a and the second dummy waveguide 103 can be ideally minimized in the course of manufacturing waveguides. Accordingly, since $R_x R_{flat}$ in equation 1 has an insignificant value, equation 1 approximates the following equation 3.

$$BXT(dB)=10 \log(R^2_{flat} R_{art}) \quad \text{equation 3}$$

When a reflection condition in the end surface 18 of the dummy waveguide 12a according to the prior art is the same as that of a reflection condition in the end surface 138 of the first dummy waveguide 121a according to the present invention, the BXT in the directional coupler 100 according to the present invention can be considerable improved. In this regard, optical signals that have been coupled to the second waveguide 102 after emitting from the light source disappear while sequentially passing through the first dummy waveguide 121a, the reflector 104 and the second dummy waveguide 103.

When the termination of the dummy waveguide 12a in the prior art and the second dummy waveguide 103 in the present invention is identically performed, the BXT of the directional coupler 100 according to the present invention can be improved by 25 dB.

Figure 9:
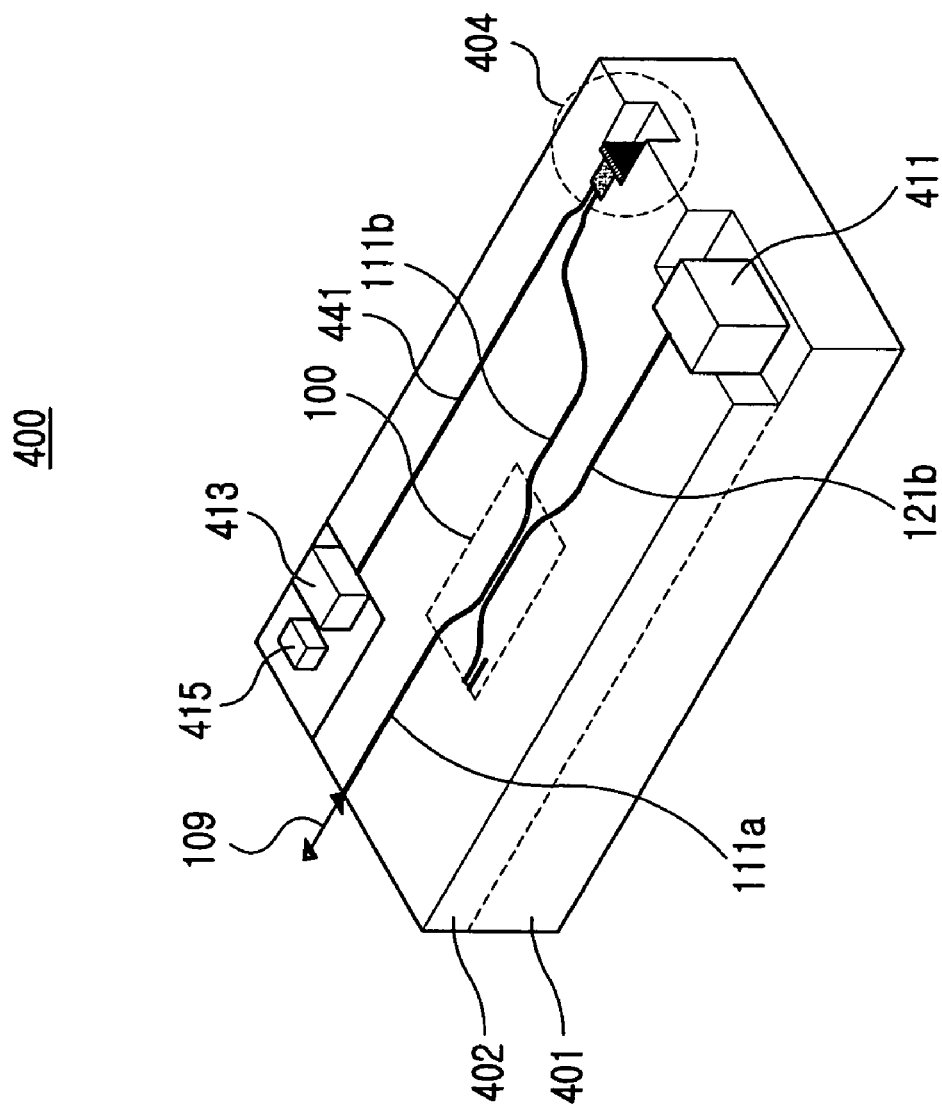
FIG. 9 is a perspective view showing an optical waveguide element including the directional coupler shown in FIG. 4.

FIG. 9 is a perspective view showing an optical waveguide element 400 including the directional coupler 100 shown in FIG. 4. In the optical waveguide 400 shown in FIG. 9, a reflector 404 and a third waveguide 441 are formed on a cladding layer 402 laminated on a predetermined substrate 401, a light source 413 and an photodetector 415 for a monitor are installed on the side of the first output waveguide 111b of the directional coupler 100, and an photodetector 411 are installed on an end surface of the second output waveguide 121b. The reflector 404 is provided at an end surface of the first output waveguide 111b, and the third waveguide 441 extends from the reflector 404 and is connected to the light source 413.

Referring now to FIG. 4 and FIG. 9, optical signals 109 input from a communication network pass through the input waveguide 111a and are input to the first waveguide 101. While passing through the first waveguide 101, the optical signals 109 are coupled to the second waveguide 102, pass through the second output waveguide 121b, and are detected by the photodetector 411. Optical signals emitted from the light source 413 sequentially pass through the third waveguide 441, the reflector 404, the first output waveguide 111b, the first waveguide 101 and the input waveguide 111a, and are transmitted to a communication network. While the optical signals emitted from the light source 413 passes through the first waveguide 101, some optical signals are coupled to the second waveguide 102 and may pass through the first dummy waveguide 121a. The optical signals passing through the first dummy waveguide 121a disappear while passing through the reflector 104 of the directional coupler 100 and the second dummy waveguide 103.

Figure 10:
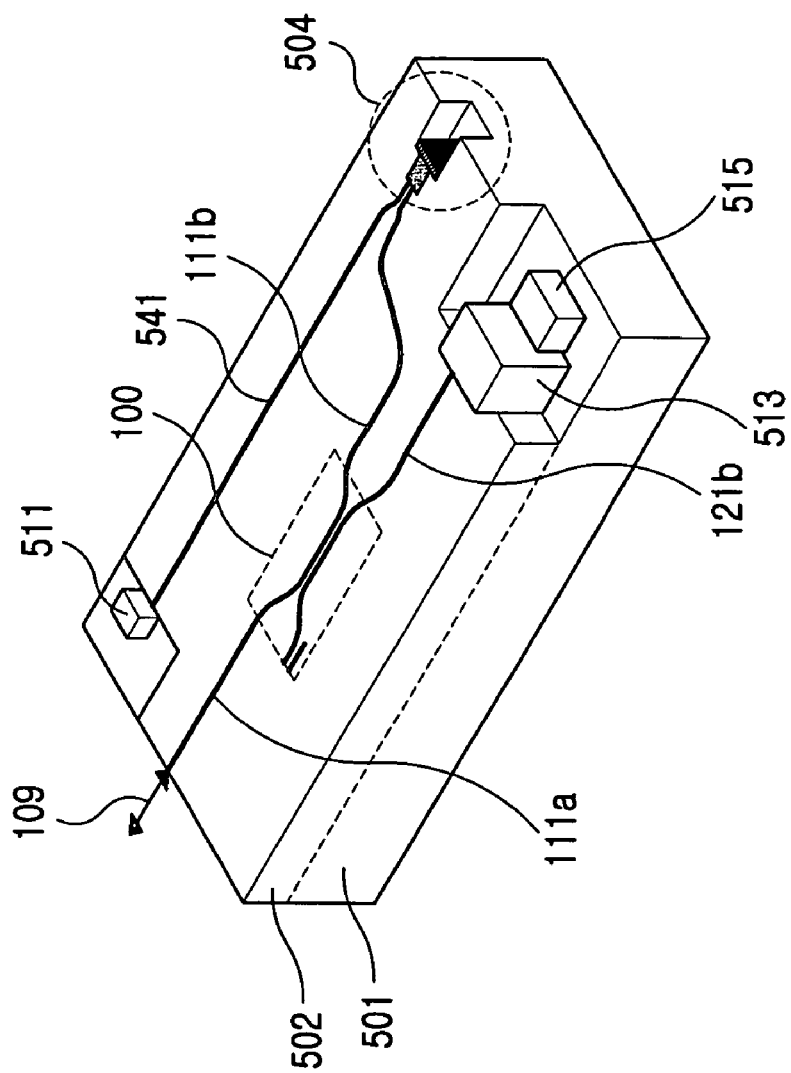
FIG. 10 is a perspective view showing an other optical waveguide element including the directional coupler shown in FIG. 4.

FIG. 10 is a perspective view showing an other optical waveguide element 500 including the directional coupler 100 shown in FIG. 4. In the optical waveguide element 500 shown in FIG. 10, a reflector 504 and a third waveguide 541 are formed on a cladding layer 502 laminated on a predetermined substrate 501, an photodetector 511 is installed on the side of the first output waveguide 111b of the directional coupler 100, and a light source 513 and an photodetector 515 are installed on the second output waveguide 121b. The reflector 504 is provided at an end surface of the first output waveguide 111b, and the third waveguide 541 extends from the reflector 504 and is connected to the photodetector 511.

Referring now to FIG. 4 and FIG. 10, optical signals 109 input from a communication network pass through the input waveguide 111a and are input to the first waveguide 101. The optical signals 109 sequentially pass through the first waveguide 101, the first output waveguide 111b, the reflector 50 and the third waveguide 541, and are detected by the photodetector 511. Optical signals emitted from the light source 513 are input to the second waveguide 102 through the second output waveguide 121b. While passing through the second waveguide 102, the optical signals emitted from the light source 513 are coupled to the first waveguide 101 and are transmitted to a communication network through the input waveguide 111a. The optical signals emitted from the light source 513 are not completely coupled to the first waveguide 101, and some optical signals may pass through the first dummy waveguide 121a. The optical signals passing through the first dummy waveguide 121a disappear while passing through the reflector 104 of the directional coupler 100 and the second dummy waveguide 103.

As described above, in directional couplers according to aspects of the present invention, a reflector and a second dummy waveguide are formed on an end surface of a first dummy waveguide so that a bi-directional cross-talk can be improved. Most optical signals input through the first dummy waveguide penetrate an end of the reflector and the second dummy waveguide and disappear. Further, optical signals reflected by an end surface of the second dummy waveguide also penetrate the reflector and disappear, thereby improving the bi-directional cross-talk.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical waveguide element having a directional coupler, a light source, and a photodetector, the directional coupler comprising:

a first waveguide and a second waveguide located adjacent to each other for mode coupling;

a first dummy waveguide extending from an one end of the second waveguide;

a reflector installed on an end surface of the first dummy waveguide; and a second dummy waveguide located adjacent to the first dummy waveguide for mode coupling, wherein the directional coupler is configured such that optical signals progressing from the second waveguide to the second dummy waveguide attenuate while sequentially passing through the first dummy waveguide, the reflector, and the second dummy waveguide, and wherein the light source and the photodetector are connected to the first and second waveguides, respectively.

2. The optical waveguide element as claimed in claim 1, further comprising:

an input waveguide extending from one end of the first waveguide, and enabling optical signals to be input to the directional coupler; and an output waveguide extending from another end of the second waveguide, wherein the optical signals input through the input waveguide are coupled to the second waveguide in the directional coupler and output to the output waveguide.

3. The optical waveguide element as claimed in claim 1, further comprising:

an input waveguide extending from one end of the first waveguide, and enabling optical signals to be input to the directional coupler;

an output waveguide extending from other end of the first waveguide;

wherein the light source is coupled to an end surface of the output waveguide, and wherein the optical signals that are generated from the light source pass through the output waveguide, and are output to the input waveguide through the first waveguide.

4. The optical waveguide element as claimed in claim 1, further comprising:

an output waveguide extending from other end of the second waveguide;

wherein the light source is coupled to an end surface of the output waveguide, and wherein the optical signals that are generated from the light source pass through the output waveguide, and are coupled to the first waveguide through the directional coupler.

5. The optical waveguide element as claimed in claim 1, wherein an end surface of the second dummy waveguide is terminated in such a way so as to be inclined with respect to a longitudinal direction of the second dummy waveguide.

6. The optical waveguide element as claimed in claim 1, further comprising a curved waveguide extending from an end surface of the second dummy waveguide.

7. The optical waveguide element as claimed in claim 1, further comprising:

an input waveguide extending from one end of the first waveguide and enabling optical signals to be input to the direction coupler; and an output waveguide extending from other end of the first waveguide, wherein the photodetector is coupled to an end surface of the output waveguide.

8. The optical waveguide element as claimed in claim 1, further comprising:

an input waveguide extending from one end of the first waveguide, and enabling optical signals to be input to the directional coupler;

an output waveguide extending from other end of the first waveguide;

a reflector installed on an end surface of the output waveguide;

a third waveguide extending from the reflector, wherein the light source is installed on an end surface of the third waveguide, and wherein optical signals that are generated from the light source sequentially pass through the third waveguide, the reflector, the output waveguide, and the directional coupler, and are outputted to the input waveguide.

9. The optical waveguide element as claimed in claim 1, further comprising:

an input waveguide extending from one end of the first waveguide, and enabling optical signals to be input to the directional coupler;

an output waveguide extending from other end of the first waveguide;

a reflector installed on an end surface of the output waveguide;

a third waveguide extending from the reflector, wherein the photodetector is installed on an end surface of the third waveguide, and wherein optical signals that are generated from the light source sequentially pass through the directional, coupler, the output waveguide, the reflector, and the third waveguide, and are input to the input waveguide through the directional coupler.

10. An optical waveguide element having a directional coupler, the directional coupler comprising:

a first waveguide and a second waveguide located adjacent to each other for mode coupling;

a first dummy waveguide extending from an one end of the second waveguide;

a second dummy waveguide having a first internally isolated end surface and being located adjacent to the first dummy waveguide for mode coupling; and a first reflector coupled to a first end surface of the first dummy waveguide, the first end surface located away from the second waveguide, and to a second end surface of the second dummy waveguide, the second end surface disposed away from the first internally isolated end surface, wherein optical signals progressing from the second dummy waveguide to the first dummy waveguide attenuate while sequentially passing through the reflector and the second dummy waveguide.

11. The optical waveguide element as claimed in claim 10, further comprising:

an input waveguide extending from one end of the first waveguide, and enabling optical signals to be input to the directional coupler; and an output waveguide extending from another end of the second waveguide, wherein the optical signals input through the input waveguide are coupled to the second waveguide in the directional coupler and are output to the output waveguide.

12. The optical waveguide element as claimed in claim 10, further comprising:

an input waveguide extending from one end of the first waveguide, and enabling optical signals to be input to the directional coupler;

an output waveguide extending from other end of the first waveguide; and a light source coupled to an end surface of the output waveguide, wherein optical signals generated from the light source pass through the output waveguide end are output to the input waveguide through the first waveguide.

13. The optical waveguide element as claimed in claim 10, further comprising:

an output waveguide extending from other end of the second waveguide; and a light source coupled to an end surface of the output waveguide, wherein optical signals generated from the light source pass through the output waveguide and are coupled to the first waveguide through the directional coupler.

14. The optical waveguide element as claimed in claim 10, wherein the internally isolated end surface of the second dummy waveguide is inclined with respect to the cross section of the second dummy waveguide.

15. The optical waveguide element as claimed in claim 10, further comprising a curved waveguide coupled to the internally isolated end surface of the second dummy waveguide.

16. The optical waveguide clement as claimed in claim 10, further comprising:

an input waveguide extending from one end of the first waveguide and enabling optical signals to be input to the direction coupler;

an output waveguide extending from other end of the first waveguide; and a photodetector coupled to an end surface of the output waveguide.

17. The optical waveguide element as claimed in claim 10, further comprising:

an input waveguide extending from one end of the first waveguide, and enabling optical signals to be input to the directional coupler;

an output waveguide extending from other end of the first waveguide;

a second reflector installed on an end surface of the output waveguide;

a third waveguide extending from the reflector; and a light source installed on an end surface of the third waveguide, wherein optical signals generated from the tight source sequentially pass through the third waveguide, the reflector, the output waveguide and the directional coupler and are outputted to the input wave guide.

18. The optical waveguide element as claimed in claim 10, further comprising:

an input waveguide extending from one end of the first waveguide, and enabling optical signals to be input to the directional coupler;

an output waveguide extending from other end of the first waveguide;

a second reflector installed on an end surface of the output waveguide;

a third waveguide extending from the reflector; and a photodetector installed on an end surface of the third waveguide, wherein optical signals generated from the light source sequentially pass through the directional coupler, the output waveguide, the reflector and the third waveguide, and are input to the input waveguide through the directional coupler.

19. The optical waveguide element as claimed in claim 10, further comprising:

an output waveguide extending from other end of the second waveguide; and a light source coupled to an end surface of the output waveguide, wherein optical signals generated from the light source are coupled to the first waveguide through the directional coupler.

20. The optical waveguide element as claimed in claim 1, wherein the directional coupler is configured such that optical signals progressing from the second waveguide to the second dummy waveguide disappear as the optical signals sequentially pass through the first dummy waveguide, the reflector, and the second dummy waveguide.

* * * * *

UNITED STATES PATENT AND TRADEMARK OFFICE
CERTIFICATE OF CORRECTION

PATENT NO. : 7,257,296 B2 Page 1 of 1
APPLICATION NO. : 10/692343
DATED : August 14, 2007
INVENTOR(S) : Kyoung-Youm Kim et al.

It is certified that error appears in the above-identified patent and that said Letters Patent is hereby corrected as shown below:

Title Page
Item [73], Assignee's address, should read as follows:

--Suwon-Si.--

Signed and Sealed this

Thirtieth Day of October, 2007

JON W. DUDAS
*Director of the United States Patent and Trademark Office*